US008765900B2

(12) United States Patent
Best et al.

(10) Patent No.: US 8,765,900 B2
(45) Date of Patent: Jul. 1, 2014

(54) ALIPHATIC MOISTURE-CURABLE RESINS, COATING COMPOSITIONS, AND RELATED PROCESSES

(75) Inventors: Kurt E. Best, Sewickley, PA (US); Michael K. Jeffries, Follansbee, WV (US); Ahren Olson, Aliquippa, PA (US); Carl Angeloff, Aliquippa, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 397 days.

(21) Appl. No.: 12/548,490

(22) Filed: Aug. 27, 2009

(65) Prior Publication Data
US 2011/0054141 A1    Mar. 3, 2011

(51) Int. Cl.
*C08G 18/79* (2006.01)
*C08G 18/73* (2006.01)
*C08G 18/75* (2006.01)
*C08G 18/48* (2006.01)
*C08G 18/30* (2006.01)

(52) U.S. Cl.
USPC ............ 528/49; 528/59; 528/67; 528/73; 528/76

(58) Field of Classification Search
USPC .................. 528/49, 59, 67, 73, 76
See application file for complete search history.

(56) References Cited

U.S. PATENT DOCUMENTS

| 4,292,350 | A | * | 9/1981 | Kubitza et al. ............. 427/385.5 |
| 4,304,706 | A | | 12/1981 | Urs |
| 4,419,513 | A | | 12/1983 | Breidenbach et al. |
| 4,810,820 | A | | 3/1989 | Slack et al. |
| 4,874,812 | A | | 10/1989 | Muller et al. |
| 5,124,427 | A | | 6/1992 | Potter et al. |
| 5,158,922 | A | | 10/1992 | Hinney et al. |
| 5,208,334 | A | | 5/1993 | Potter et al. |
| 5,235,018 | A | | 8/1993 | Potter et al. |
| 5,444,146 | A | | 8/1995 | Potter et al. |
| 5,908,895 | A | | 6/1999 | Vogt-Birnbrich et al. |
| 7,038,003 | B2 | | 5/2006 | Mager et al. |
| 7,737,243 | B2 | * | 6/2010 | Adams et al. ............. 528/60 |
| 2004/0005413 | A1 | | 1/2004 | Li et al. |
| 2007/0282070 | A1 | * | 12/2007 | Adams et al. ............. 525/127 |
| 2008/0119629 | A1 | * | 5/2008 | Ohwada et al. ............. 528/53 |

FOREIGN PATENT DOCUMENTS

| EP | 0654302 B1 | 5/2003 |
| JP | 11080304 A | 3/1999 |
| JP | 11322879 | 11/1999 |
| JP | 2001294750 | 10/2001 |
| WO | 02/44234 A1 | 6/2002 |

OTHER PUBLICATIONS

Szycher, Michael; Szycher's Handbook of Polyurethanes; CRC Press; New York; 1999; pp. 20-1-20-4.*

* cited by examiner

*Primary Examiner* — Rabon Sergent
(74) *Attorney, Agent, or Firm* — Donald R. Palladino; Robert S. Klemz

(57) ABSTRACT

The present disclosure is directed to an aliphatic isocyanate-based moisture-curable resin. The disclosed resin may include an aliphatic isocyanate functional material and an cycloaliphatic isocyanate functional material. The resin may be used to formulate a coating composition that may exhibit no substantial sag when applied at a wet film thickness of at least 6 mils, and no substantial blistering when cured to a dry film thickness of at least 6 mils.

13 Claims, 7 Drawing Sheets

ALIPHATIC MOISTURE-CURABLE RESINS, COATING COMPOSITIONS, AND RELATED PROCESSES

TECHNICAL FIELD

The present disclosure is directed to aliphatic moisture-curable resins comprising polyisocyanate functional materials. The present disclosure is also directed to coating compositions comprising aliphatic moisture-curable resins comprising polyisocyanate functional materials. The present disclosure is also directed to processes employing aliphatic moisture-curable resins and coating compositions comprising polyisocyanate functional materials.

BACKGROUND

Compositions based on isocyanate chemistry find utility as components in coatings, such as, for example, paints, primers, and the like. Isocyanate-based coating compositions may include, for example, polyurethane coatings formed from resins comprising components, such as, for example, diisocyanates, polyisocyanates, and/or isocyanate reaction products. These resins may cure by various mechanisms so that covalent bonds form between the resin components, thereby producing a cross-linked polymer network.

Moisture-curable (i.e., moisture-curing) coatings based on isocyanate-functional resins represent one type of isocyanate-based coating technology. Isocyanate-based moisture-curable coatings may generally comprise, for example, diisocyanates, polyisocyanates, and/or isocyanate reaction products having free isocyanate groups that may react with atmospheric moisture to produce insoluble and relatively high molecular weight cross-linked polyurethane networks, which may form the structural component of the cured coatings. As used herein, the term "polyurethane" means polymeric or oligomeric materials comprising The curing process may involve the reaction of free isocyanate groups with atmospheric water molecules to form a carbamic acid intermediate that decomposes into amine groups and carbon dioxide. The amine groups formed in situ by way of the isocyanate-water reaction may react with additional free isocyanate groups to form urea crosslinks between resin components. In this manner, a resin may be applied to a substrate, exposed to ambient atmosphere, and cure to form a polyurethane coating on the substrate.

SUMMARY

Embodiments disclosed herein are directed to an isocyanate-functional moisture-curable resin. The resin may comprise an aliphatic isocyanate functional material and a cycloaliphatic isocyanate functional material. The aliphatic isocyanate functional material may comprise a reaction product of an aliphatic diisocyanate and a hydroxy-functional ether compound. The cycloaliphatic isocyanate functional material may comprise a reaction product of a cycloaliphatic diisocyanate and a mono-functional alcohol compound. The resin may be used to formulate a coating composition that may exhibit no substantial sag when applied at a wet film thickness of at least 6 mils. The coating composition may also exhibit no substantial blistering when cured to a dry film thickness of at least 6 mils.

Other embodiments disclosed herein are directed to a process for increasing the sag resistance and blistering resistance of a coating composition. The process may comprise preparing a coating composition comprising a moisture-curable resin. The resin may comprise an aliphatic isocyanate functional material and a cycloaliphatic isocyanate functional material. The aliphatic isocyanate functional material may comprise a reaction product of an aliphatic polyisocyanate and a hydroxy-functional ether compound. The cycloaliphatic isocyanate functional material may comprise a reaction product of a cycloaliphatic polyisocyanate and a mono-functional alcohol compound. A coating composition comprising the resin may exhibit no substantial sag when applied at a wet film thickness of at least 6 mils. A coating composition comprising the resin composition may also exhibit no substantial blistering when cured to a dry film thickness of at least 6 mils.

It is understood that the invention is not limited to the embodiments disclosed in this Summary. The invention is intended to cover modifications that are within the scope of the invention as defined solely by the claims.

BRIEF DESCRIPTION OF THE DRAWINGS

Certain characteristics of the disclosed embodiments may be better understood by reference to the accompanying figures, in which.

DETAILED DESCRIPTION

Figure 1:
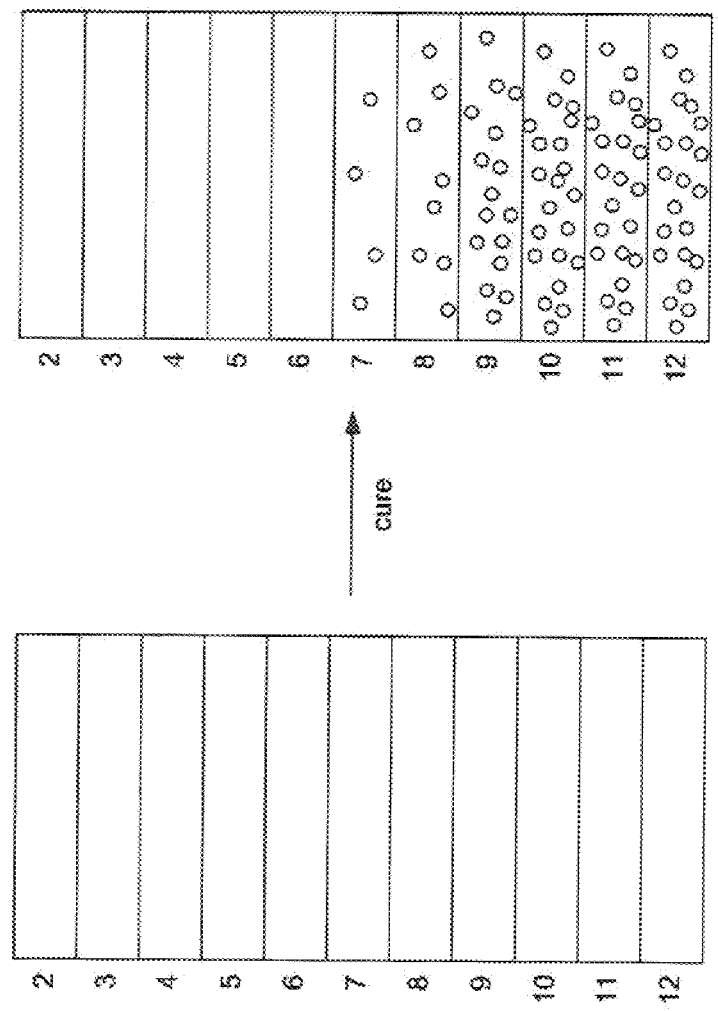
FIG. 1 is a diagram illustrating a gradient panel used to measure the film build to thickness of an applied coating composition.

It is to be understood that certain descriptions of the disclosed embodiments have been simplified to illustrate only those elements, features and aspects that are relevant to a clear understanding of the disclosed embodiments, while eliminating, for purposes of clarity, other elements, features and aspects. Persons having ordinary skill in the art, upon considering the present description of the disclosed embodiments, will recognize that other elements and/or features may be desirable in a particular implementation or application of the disclosed embodiments. However, because such other elements and/or features may be readily ascertained by persons having ordinary skill upon considering the present description of the disclosed embodiments, and are not necessary for a complete understanding of the disclosed embodiments, a description of such elements and/or features is not provided herein. As such, it is to be understood that the description set forth herein is merely exemplary and illustrative of the disclosed embodiments and is not intended to limit the scope of the invention as defined solely by the claims.

In the present disclosure, including the claims, other than where otherwise indicated, all numbers expressing quantities or characteristics are to be understood as being prefaced and modified in all instances by the term "about." Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. Any maximum numerical limitation recited herein is intended to include all lower numerical limitations subsumed therein and any minimum numerical limitation recited herein is intended to include all higher numerical limitations subsumed therein. Accordingly, Applicant(s) reserves the right to amend the present disclosure, including the claims, to expressly recite any sub-range subsumed within the ranges expressly recited herein. All such ranges are intended to be inherently disclosed herein such that amending to expressly recite any such sub-ranges would comply with the requirements of 35 U.S.C. §112, first paragraph, and 35 U.S.C. §132(a).

The grammatical articles "one," "a," "an," and "the," as used herein, are intended to include "at least one" or "one or more," unless otherwise indicated. Thus, the articles are used herein to refer to one or more than one (i.e., to at least one) of the grammatical objects of the article. By way of example, "a component" means one or more components, and thus, possibly, more than one component is contemplated and may be employed or used.

Any patent, publication, or other disclosure material, in whole or in part, that is said to be incorporated by reference herein, is incorporated herein in its entirety, but only to the extent that the incorporated material does not conflict with existing definitions, statements, or other disclosure material expressly set forth in this disclosure. As such, and to the extent necessary, the express disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

As used herein, the terms "film thickness" and "film build" are synonymous and refer to the depth of a coating composition applied to a substrate (typically measured in units of mils, i.e. one thousandth of one inch). Film thickness may be measured as wet film thickness ("WFT"), i.e. the depth of a coating composition applied to a substrate before cure. Film thickness may also be measured and as dry film thickness ("DFT"), i.e. the depth of a coating composition applied to a substrate after cure. The WFT of an applied coating composition is generally measured shortly following the application of the coating. The DFT of an applied coating composition is generally measured after the coating composition is hard dry ("HD").

As used herein, the term "aliphatic" refers to organic compounds characterized by substituted or un-substituted straight, branched, and/or cyclic chain arrangements of constituent carbon atoms. Aliphatic compounds do not contain aromatic rings as part of the molecular structure of the compounds. As used herein, the term "cycloaliphatic" refers to organic compounds characterized by arrangement of carbon atoms in closed ring structures. Cycloaliphatic compounds do not contain aromatic rings as part of the molecular structure of the compounds. Hence, cycloaliphatic compounds are a subset of aliphatic compounds. Accordingly, an aliphatic composition may comprise an aliphatic compound and/or a cycloaliphatic compound.

As used herein the term "diisocyanate" refers to a compound containing two isocyanate groups. As used herein the term "polyisocyanate" refers to a compound containing two or more isocyanate groups. Hence, diisocyanates are a subset of polyisocyanates.

Coating compositions, such as, for example, isocyanate-based moisture-curable protective coatings, may require multiple applications due to limitations on the film thickness of the coating when applied to a substrate. For example, one limitation on the film thickness of an applied coating may be sag. Sag refers to the tendency of an applied liquid coating composition to run or spread on a substrate surface before the coating composition cures. For example, a liquid coating composition may run (i.e., sag) under the influence of gravity when the liquid coating composition is applied to a vertically disposed or inclined substrate.

In general, the greater the WFT of an applied liquid coating composition, the greater the tendency of the applied coating composition to sag before cure. See ASTM D 4400—*Standard Test Method for Sag Resistance of Paints Using a Mulitnotch Applicator*, incorporated by reference herein, for a description of a method for assessing sag resistance. The occurrence of sag in an applied liquid coating composition may adversely affect various coating properties, such as, for example, uniformity of thickness and gloss of the cured coating. This may have an adverse impact on the overall film build of an applied coating.

Another limitation on the film thickness of applied coatings—particularly isocyanate-based moisture-curable coatings—may be blistering. Blistering refers to the tendency of an applied moisture-curable coating composition to develop blisters or craters. Isocyanate-based moisture-curable coatings may develop blistering as a result of carbon dioxide gas becoming trapped underneath a portion of at least partially-cured coating film. The carbon dioxide gas generally forms as a product of the isocyanate-water reaction, which occurs when isocyanate groups react with water to form amine groups, which in turn react with excess isocyanate groups to form urea groups. An isocyanate-based moisture-curing coating may prevent the gas from escaping out of the applied coating film, thereby forming pockets of trapped gas, which appear as blisters or bubbles in the film. The pressure of the trapped gas may also exceed the strength of the partially-cured film and rupture through the surface of the applied film, thereby forming voids or craters in the surface of the applied coating.

In general, the greater the thickness of an applied liquid coating, the greater the tendency of the applied coating to blister during cure. See ASTM D 714—*Standard Test Method for Evaluating Degree of Blistering of Paints*, incorporated by reference herein, for a description of a method for assessing blistering resistance. The occurrence of blistering in an applied coating composition may adversely affect various coating properties, such as, for example, uniformity of thickness, gloss, and weatherability of the cured coating. This may have an adverse impact on the overall film build of an applied coating.

As a result, isocyanate-based moisture-curable coatings have previously been limited to an applied WFT of about 4-6 mils and a cured DFT of about 3-4 mils. When prior isocyanate-based moisture-curable coatings are applied at greater than a 4-6 mil WFT, substantial sag may occur in the applied coating, particularly when the coating is applied to a vertically-disposed or inclined substrate. When prior isocyanate-based moisture-curable coatings are applied and cured to greater than a 3-4 mil DFT, substantial blistering may occur in the cured coating.

Embodiments disclosed herein are directed to an engineered isocyanate-based resin that exhibits improved film-forming and coating properties compared to prior isocyanate-based resins. The disclosed engineered resin is an aliphatic isocyanate functional material. The engineered resin may be used to formulate moisture-curable coating compositions that may be applied to substrates at greater than a 6 mil WFT with no substantial sag. The disclosed engineered resins may be used to formulate moisture-curable coating compositions that may be applied to substrates and cured to greater than a 6 mil DFT with no substantial blistering.

As used herein, the phrase "no substantial sag" refers to the property of an applied liquid coating characterized in that the coating does not exhibit observable sag when evaluated according to ASTM D 4400. As used herein, the phrase "no substantial blistering" refers to the property of an applied and cured liquid coating characterized in that no moisture cure blisters are observable in the cured film, as shown in FIG. 1 and described below.

Moisture-curable coating compositions formulated with the disclosed engineered resin may exhibit better weathering resistance compared to coating compositions formulated with prior isocyanate-based resins. The improvement in weathering resistance may be evaluated according to ASTM D 4587—*Standard Practice for Fluorescent UV-Condensation Exposures of Paint and Related Coatings* and/or ASTM D 1014—*Standard Practice for Conducting Exterior Exposure Tests of Paints and Coatings on Metal Substrates*, each of which is incorporated by reference herein.

The disclosed engineered resin may comprise a combination of an aliphatic isocyanate functional material and a cycloaliphatic isocyanate functional material. The aliphatic isocyanate functional material may comprise a reaction product of an aliphatic diisocyanate and a hydroxy-functional ether compound. The cycloaliphatic isocyanate functional material may comprise a reaction product of a cycloaliphatic diisocyanate and a mono-functional alcohol compound. The aliphatic isocyanate functional material and the cycloaliphatic isocyanate functional material may each comprise at least one functional group selected from the group consisting of isocyanurate, iminooxadiazine, uretdione, allophanate, biuret, and combinations of any thereof. The aliphatic and cycloaliphatic isocyanate functional materials may be produced from and/or comprise polyisocyanates having an isocyanate functionality greater than 2.

Isocyanurates may be prepared by the cyclic trimerization of polyisocyanates. Trimerization may be performed, for example, by reacting three (3) equivalents of a polyisocyanate to produce 1 equivalent of isocyanurate ring. The three (3) equivalents of polyisocyanate may comprise three (3) equivalents of the same polyisocyanate compound, or various mixtures of two (2) or three (3) different polyisocyanate compounds. Compounds, such as, for example, phosphines, Mannich bases and tertiary amines, such as, for example, 1,4-diaza-bicyclo[2.2.2]octane, dialkyl piperazines, and the like, may be used as trimerization catalysts. Iminooxadiazines may be prepared by the asymmetric cyclic trimerization of polyisocyanates. Uretdiones may be prepared by the dimerization of a polyisocyanate. Allophanates may be prepared by the reaction of a polyisocyanate with a urethane. Biurets may be prepared via the addition of a small amount of water to two equivalents of polyisocyanate and reacting at slightly elevated temperature in the presence of a biuret catalyst. Biurets may also be prepared by the reaction of a polyisocyanate with a urea.

Polyisocyanates that may find utility in the production of isocyanurates, iminooxadiazines, biurets, uretdiones and allophanates, and which may find utility in the production of aliphatic and cycloaliphatic isocyanate functional materials for use in the disclosed engineered resin, may include aliphatic and cycloaliphatic diisocyanates, such as, for example, ethylene diisocyanate; 1,4-tetramethylene diisocyanate; 1,6-hexamethylene diisocyanate ("HDI"); 2,2,4-trimethyl-1,6-hexamethylene diisocyanate; 1,12-dodecamethylene diisocyanate; 1-isocyanato-3-isocyanatomethyl-3,5,5-trimethyl-cyclohexane (isophorone diisocyanate or "IPDI"); bis-(4-isocyanatocyclohexyl)methane ("H$_{12}$MDI"); bis-(4-isocyanato-3-methyl-cyclohexyl)methane, and combinations of any thereof. Additional polyisocyanates (including various diisocyanates) that may also find utility in the production of aliphatic and cycloaliphatic isocyanate functional materials may include the polyisocyanates described in U.S. Pat. Nos. 4,810,820; 5,208,334; 5,124,427; 5,235,018; 5,444,146; and 7,038,003, each of which is incorporated by reference herein. Combinations of any of the above-identified and incorporated polyisocyanates may also be used to produce the aliphatic and cycloaliphatic isocyanate functional materials for use in the disclosed engineered resin.

In various embodiments, isocyanate functional materials comprising an adduct of a polyisocyanate and a hydroxy-functional compound may find utility in the disclosed engineered resins. Isocyanate functional materials may be formed, for example, by reacting an aliphatic or cycloaliphatic polyisocyanate with a hydroxy-functional compound, such as, for example, a mono-functional alcohol ("monoalcohol" or "monol"), a poly-functional alcohol ("polyol"), a mixture of monols, a mixture of polyols, or a mixture of monols and polyols. A polyisocyanate may be reacted with a hydroxy-functional compound to produce a polyisocyanate-hydroxyl compound adduct comprising urethane groups and/or allophanate groups, for example. In certain embodiments, polyisocyanates may be reacted with hydroxy-functional compounds at an OH:NCO molar ratio of 1:1.5 to 1:20. In other embodiments, polyisocyanates may be reacted with hydroxy-functional compounds at an OH:NCO molar ratio of 1:2 to 1:15, or 1:5 to 1:15.

Polyisocyanates that may be used to produce aliphatic and cycloaliphatic isocyanate functional materials may include, for example, the aliphatic and cycloaliphatic diisocyanates described above. Polyisocyanates that may be used to produce isocyanate functional materials may also include, for example, compounds produced from the diisocyanates described above and comprising at least one functional group selected from the group consisting of isocyanurate, iminooxadiazine, uretdione, allophanate, biuret, and combinations of any thereof.

Hydroxy-functional compounds that may be used to produce aliphatic and cycloaliphatic isocyanate functional materials may include, for example, low molecular weight monohydric or polyhydric aliphatic alcohols (which may optionally contain ether groups), monohydric or polyhydric cycloaliphatic alcohols (which may optionally contain ether groups), polythioethers, polyacetals, polycarbonates, polyesters, polyethers, and combinations of any thereof. Hydroxy-functional compounds that may be used to produce aliphatic and cycloaliphatic isocyanate functional materials may also include, for example, the hydroxyl-containing compounds described in U.S. Pat. Nos. 4,810,820; 5,208,334; 5,124,427; 5,235,018; 5,444,146; and 7,038,003, each of which is incorporated by reference herein.

In various embodiments, hydroxy-functional polymeric and/or oligomeric polyethers may be used to produce the aliphatic isocyanate functional material comprising the disclosed engineered resin. As used herein, the term "polyether" refers to both polymeric and oligomeric compounds containing ether groups. Polyethers that may find utility in producing aliphatic isocyanate functional materials may include polyethers having from one to four free hydroxyl groups. Polyethers may be prepared, for example, by the oligomerization or polymerization of epoxides. Such epoxides may include, for example, ethylene oxide, propylene oxide, butylene oxide, tetrahydrofuran, styrene oxide, or epichlorohydrin. Each epoxide may be reacted alone (e.g., in the presence of boron trifluoride), as a mixture with a starting component having reactive hydrogen atoms, or by successive addition of the epoxide to a starting component having reactive hydrogen atoms. Starting components that may find utility in preparing polyethers may include, for example, water, alcohols, and phenols. Suitable starting components may include ethylene glycol; (1,3)- and (1,2)-propylene glycol; and trimethylolpropane, for example.

In various embodiments, the disclosed engineered resin comprises an aliphatic isocyanate functional material comprising a reaction product of a diisocyanate and a hydroxy-functional polyether. Hydroxy-functional polyethers that may find utility in the production of aliphatic isocyanate functional materials may include, for example, hydroxy-functional alkylene ether polyols, such as, for example, hydroxy-functional poly(tetra-methylene glycol), polypropylene oxide), poly(ethylene oxide), and poly(ethylene-co-propylene oxide). Polyether polyols that may find utility in the production of aliphatic isocyanate functional materials may also include, for example, ethylene oxide and/or propylene oxide adducts of polyols, such as, for example, the ethylene oxide and/or propylene oxide adducts of ethylene glycol or butylene glycol. In certain embodiments, polycaprolactone, which may function similarly to a hydroxy-functional polyether, may find utility in the production of an aliphatic isocyanate functional material comprising the disclosed engineered resin.

In various embodiments, hydroxy-functional compounds that may be used to produce cycloaliphatic isocyanate functional materials may include, for example, one or more mono-functional alcohols, such as, for example, methanol, ethanol, n-propanol, isopropanol, butanol isomers, pentanol isomers, hexanol isomers, heptanol isomers, octanol isomers, nonanol isomers, decanol isomers, 2-ethylhexanol, trimethyl hexanol, cyclohexanol, fatty alcohols having 11 to 20 carbon atoms, vinyl alcohol, allyl alcohol, and combinations of any thereof. In certain embodiments, mono-functional alcohols that may be used to produce cycloaliphatic isocyanate functional materials may include linear, branched, or cyclic alcohols containing 6 to 9 carbon atoms. In certain embodiments, the mono-functional alcohols may contain ether groups.

The engineered resin may be prepared, for example, by combining the aliphatic isocyanate functional material and the cycloaliphatic isocyanate functional material in a weight ratio engineered to produce a coating composition that may exhibit no substantial sag when applied at a wet film thickness of at least 6 mils. The engineered resin may also be prepared, for example, by combining the aliphatic isocyanate functional material and the cycloaliphatic isocyanate functional material in a weight ratio engineered to produce a coating composition that may exhibit no substantial blistering when cured to a dry film thickness of at least 6 mils. The engineered resin may also be prepared, for example, by combining the aliphatic isocyanate functional material and the cycloaliphatic isocyanate functional material in a weight ratio engineered to produce a coating composition that may exhibit better weathering resistance than prior isocyanate-based moisture-curable coating compositions.

The engineered resin may be prepared, for example, by combining the aliphatic isocyanate functional material and the cycloaliphatic isocyanate functional material in a weight ratio engineered to produce a coating composition that may exhibit no substantial sag when applied at a WFT of 6 mils, 7 mils, 8 mils, 9 mils, 10 mils, 11 mils, 12 mils, or greater. The engineered resin may also be prepared, for example, by combining the aliphatic isocyanate functional material and the cycloaliphatic isocyanate functional material in a weight ratio engineered to produce a coating composition that may exhibit no substantial blistering when cured to a DFT of 6 mils, 7 mils, 8 mils, 9 mils, 10 mils, 11 mils, 12 mils, or greater. The engineered resin may be prepared by combining the isocyanate functional materials in a weight ratio engineered to produce a coating composition exhibiting any combination of the above-described properties.

In certain embodiments, the aliphatic isocyanate functional material may comprise an HDI-based aliphatic isocyanate functional material. The HDI-based aliphatic isocyanate functional material may comprise at least one allophanate group, for example. The HDI-based aliphatic isocyanate functional material may comprise, for example, a reaction product of a hydroxy-functional ether compound and HDI. The ether compound may comprise a hydroxy-functional polyether, for example. A hydroxy-functional polyether may comprise, for example, a polyetherpolyol as described in U.S. Pat. No. 7,038,003, incorporated by reference herein.

In various embodiments, a hydroxy-functional polyether may have a number-average molecular weight ($M_n$) of from 300 to 20000 g/mol. In certain embodiments, a hydroxy-functional polyether may have a number-average molecular weight ($M_n$) of from 1000 to 12000 g/mol, and in other embodiments 1000 to 4000 g/mol.

Additionally, hydroxy-functional polyethers may contain less than or equal to 0.02 milliequivalent of unsaturated end groups per gram of polyol (meq/g), in some embodiments less than or equal to 0.015 meq/g, and in other embodiments less than or equal to 0.01 meq/g (determined according to ASTM D 2849-69, incorporated by reference herein). Further, hydroxy-functional polyethers may have a relatively narrow molecular weight distribution (e.g., a polydispersity ($M_w/M_n$) of from 1.0 to 1.5) and/or an OH functionality of ≥1.9. In certain embodiments, hydroxy-functional polyethers may have OH functionalities of less than 6, or less than 4, for example.

Hydroxy-functional polyethers that may find utility in the disclosed engineered resins may be prepared by alkoxylating suitable starter molecules, for example, using double metal cyanide catalysts (DMC catalysis), which is described, for example, in U.S. Pat. No. 5,158,922 and E.P. Publication No. A 0 654 302, each of which are incorporated by reference herein.

In various embodiments, the HDI-based aliphatic isocyanate functional material may be prepared by reacting HDI with a polyether prepared using DMC catalysis. In certain embodiments, the HDI-based aliphatic isocyanate functional material comprises a reaction product of HDI and polypropylene glycol, characterized in that the reaction product comprises allophanate groups.

The HDI-based aliphatic isocyanate functional material may comprise an average isocyanate functionality of at least 4, a glass transition temperature of less than −40° C., and/or a % NCO of less than 10%. The HDI-based aliphatic isocyanate functional material may be essentially free of HDI isocyanurate trimer.

An HDI-based aliphatic isocyanate functional material comprising a reaction product of a hydroxy-functional compound and HDI, and having at least one allophanate group, may be prepared according to the processes described, for example, in U.S. Pat. No. 7,038,003.

In certain embodiments, the cycloaliphatic isocyanate functional material may comprise an IPDI-based cycloaliphatic isocyanate functional material. The IPDI-based cycloaliphatic isocyanate functional material may comprise at least one allophanate group and at least one isocyanurate trimer group, for example. The IPDI-based cycloaliphatic isocyanate functional material may comprise, for example, a reaction product of a mono-functional alcohol and IPDI. The mono-functional alcohol may comprise a monoalcohol as described in U.S. Pat. Nos. 5,124,427; 5,235,018; 5,208,334; and 5,444,146, incorporated by reference herein.

In various embodiments, the IPDI-based cycloaliphatic isocyanate functional material may be prepared by reacting IPDI with a monoalcohol to produce a polyisocyanate mixture having an NCO content of 10% to 47% by weight, a viscosity of less than 10,000 mPa·s, and containing isocyanurate and allophanate groups in a molar ratio of monoisocyanurates to monoallophanates of 10:1 to 1:5. In certain embodiments, the IPDI-based cycloaliphatic isocyanate functional material comprises a reaction product of IPDI and a monoalcohol selected from the group consisting of methanol, ethanol, n-propanol, isopropanol, butanol isomers, pentanol isomers, hexanol isomers, heptanol isomers, octanol isomers, nonanol isomers, decanol isomers, 2-ethylhexanol, trimethyl hexanol, cyclohexanol, fatty alcohols having 11 to 20 carbon atoms, vinyl alcohol, allyl alcohol, and combinations of any thereof. In other embodiments, the monoalcohol may be selected from the group consisting of methanol, ethanol, 1-butanol, 2-butanol, ethylene glycol monomethyl ether, 1-methoxy-2-propanol, isocetyl alcohol, 1-dodecanol, and a mono-hydroxy poly(ethylene oxide), characterized in that the IPDI reaction product comprises isocyanurate and allophanate groups in a molar ratio of monoisocyanurates to monoallophanates of 10:1 to 1:5.

The IPDI-based cycloaliphatic isocyanate functional material may comprise an average isocyanate functionality of at least 2.3, a glass transition temperature between 25° C. and 65° C., and/or a % NCO of 10% to 47% by weight.

In various embodiments, the cycloaliphatic isocyanate functional material (e.g., an IPDI-based cycloaliphatic isocyanate functional material) and the aliphatic isocyanate functional material (e.g., an HDI-based aliphatic isocyanate functional material) may be combined in a weight ratio ranging from 1:99 to 99:1 cycloaliphatic isocyanate functional material to aliphatic isocyanate functional material. In certain embodiments, the engineered resin may comprise 95:5 to 50:50 cycloaliphatic isocyanate functional material to aliphatic isocyanate functional material, by weight. In certain other embodiments, the engineered resin may comprise 75:25 to 65:35 cycloaliphatic isocyanate functional material to aliphatic isocyanate functional material, by weight. In certain other embodiments, the engineered resin may comprise 73:27 to 69:31 cycloaliphatic isocyanate functional material to aliphatic isocyanate functional material, by weight.

In certain embodiments, the engineered resin may comprise from 50 weight percent to 100 weight percent cycloaliphatic isocyanate functional material (e.g., an IPDI-based cycloaliphatic isocyanate functional material). The disclosed resin may comprise from 0 weight percent to 50 weight percent aliphatic isocyanate functional material (e.g., an HDI-based aliphatic isocyanate functional material). In certain other embodiments, the disclosed resin may comprise 50%-99%, 50%-95%, 50%-90%, 50%-80%, 50%-70%, or 50%-60%, by weight, cycloaliphatic isocyanate functional material. In certain other embodiments, the disclosed resin may comprise 1%-50%, 5%-50%, 10%-50%, 20%-50%, 30%-50%, or 40%-50%, by weight, aliphatic isocyanate functional material.

In certain embodiments, the disclosed resin may comprise 60%-99%, 60%-95%, 60%-90%, 60%-80%, or 60%-70%, by weight, cycloaliphatic isocyanate functional material. In certain other embodiments, the disclosed resin may comprise 70%-99%, 70%-95%, 70%-90%, or 70%-80%, by weight, cycloaliphatic isocyanate functional material. In certain other embodiments, the disclosed resin may comprise 65%-75%, by weight, cycloaliphatic isocyanate functional material.

In certain embodiments, the disclosed resin may comprise 1%-40%, 5%-40%, 10%-40%, 20%-40%, or 30%-40%, by weight, aliphatic isocyanate functional material. In certain other embodiments, the disclosed resin may comprise 1%-30%, 5%-30%, 10%-30%, or 20%-30%, by weight, aliphatic isocyanate functional material. In certain other embodiments, the disclosed resin may comprise 25%-35%, by weight, aliphatic isocyanate functional material.

The engineered resin may exhibit improved film-forming and coating properties compared to prior isocyanate-based resin formulations. For example, the engineered resin may be used to formulate a moisture-curable coating composition that may be applied with a WFT of 6 mils or greater without exhibiting substantial sag according to ASTM D 4400. The engineered resin may be used to formulate a moisture-curable coating composition that may be applied and cured to a DFT of 6 mils or greater without exhibiting substantial blistering according.

Blistering resistance may be quantified by measuring the film build to blister ("FBTB") of a coating composition comprising an isocyanate-based moisture-curable resin. The FBTB of a coating composition is the greatest DFT of a cured coating that does not exhibit substantial blistering on a panel having the coating applied with a thickness gradient. FIG. 1 illustrates a gradient panel used to measure the FBTB of an applied coating. A coating composition is applied to the panel from a relatively thin to relatively thick build. For example, a coating composition may be applied with a constant thickness gradient so that the cured coating has a 2 mils DFT at one end of the panel and a 12 mils DFT at the other end. If the cured coating exhibits observable blistering at 7 mils DFT, the FBTB is 6 mils and the coating may be said to exhibit no substantial blistering when applied at a DFT of at least 6 mils.

The engineered resin may also be used to formulate a moisture-curable coating composition that exhibits improved weathering resistance relative to moisture-curable coating compositions containing prior isocyanate-based resins. For example, a moisture-curable coating composition comprising the engineered resin may exhibit greater gloss retention after accelerated weathering according to ASTM D 4587 than moisture-curable coating compositions containing prior isocyanate-based resins. A moisture-curable coating composition comprising the engineered resin may exhibit greater gloss retention after exposure in south Florida according to ASTM D 1014 than moisture-curable coating compositions containing prior isocyanate-based resins.

In various embodiments, the engineered resin may be used to formulate a moisture-curable coating composition. The moisture-curable coating composition may comprise the engineered resin and additional components. In various embodiments, the moisture-curable coating composition may comprise, for example, the engineered resin, additive resins, pigments, tint pastes, pigment wetting agents, pigment dispersants, light stabilizers, UV-absorbers, rheology modifiers, defoamers, dehydrators, solvents, catalysts, or additives to affect, for example, substrate wetting, film leveling, coating surface tension, pigment grinding, pigment deflocculation, or gloss.

In certain embodiments, the moisture-curable coating composition may comprise the engineered resin and one or more additive resins, such as, for example, Joncryl® 611 (BASF Corporation) and/or Neocryl B734™ (DSM N.V.). Joncryl® 611 is a styrene-acrylic acid copolymer resin. Joncryl® 611 may be used as an additive resin in a moisture-curable coating composition to affect pigment dispersion and film-forming properties, for example. Neocryl B-734™ is a methyl methacrylate, n-butyl methacrylate copolymer resin. Neocryl B-734™ may be used as an additive resin to affect pigment dispersion and film-forming properties, for example.

In certain embodiments, the moisture-curable coating composition may comprise the engineered resin and one or more pigments, such as, for example, titanium dioxide. Pigments that may find utility in the disclosed moisture-curable coating composition may include, for example, Kronos™ 2310 (Kronos Worldwide, Inc.) and/or Ti-Pure® R-706 (DuPont). In certain embodiments, the disclosed moisture-curable coating composition may comprise one or more fillers. Fillers that may find utility in the disclosed moisture-curable coating composition may include, for example, Imsil® A-10 (Unimin Corporation) and/or Nytal® 3300 (R. T. Vanderbilt Company).

In certain embodiments, the moisture-curable coating composition may comprise the engineered resin and one or more pigment wetting agents or dispersants. Pigment wetting agents and dispersants that may find utility in the disclosed moisture-curable coating composition may include, for example, Disperbyk®-110 (BYK-Chemie GmbH), Disperbyk®-192 (BYK-Chemie GmbH), and/or Anti-Terra U (BYK-Chemie GmbH).

The moisture-curable coating composition may comprise the engineered resin and one or more rheology modifiers. Rheology modifiers that may find utility in the disclosed moisture-curable coating composition may include, for example, Byk® 430, Byk® 431 (BYK-Chemie GmbH), Bentonite clays, and/or castor oil derivatives. In certain embodiments, a moisture-curable coating composition may comprise the disclosed engineered resin and one or more defoamers. Defoamers that may find utility in the disclosed moisture-curable coating composition may include, for example, Byk® 077 (BYK-Chemie GmbH).

In certain embodiments, the moisture-curable coating composition may comprise the engineered resin and one or more light stabilizers and/or UV-absorbers. Light stabilizers that may find utility in the disclosed moisture-curable coating composition may include, for example, Tinuvin® 292 (Ciba/BASF). UV-absorbers that may find utility in the disclosed moisture-curable coating composition may include, for example, Tinuvin® 1130 (Ciba/BASF). In certain other embodiments, the moisture-curable coating composition may comprise the engineered resin and one or more dehydrators. Dehydrators that may find utility in the disclosed moisture-curable coating composition may include, for example, p-toluenesulfonyl isocyanate, isophorone diisocyanate, and/or hexamethylene diisocyanate.

In other embodiments, the moisture-curable coating composition may comprise the engineered resin and one or more catalysts, such as, for example, dibutyltin dilaurate or a tertiary amine. Catalysts that may find utility in the disclosed moisture-curable coating composition may include, for example, Dabco® T-12 (Air Products and Chemicals, Inc.) and/or 1,4-diazabicyclo[2.2.2]octane.

The moisture-curable coating composition may comprise the engineered resin and one or more additional additives. Additional additives that may find utility in the disclosed moisture-curable coating composition may include, for example, Byk® 358, and/or Byk® 306 (BYK-Chemie GmbH).

In certain embodiments, the moisture-curable coating composition may comprise the engineered resin and one or more solvents. Solvents that may find utility in the disclosed moisture-curable coating composition may include, for example, methyl n-amyl ketone ("MAK"), Aromatic™ 100 (ExxonMobile Chemical), Aromatic™ 150 (ExxonMobile Chemical), xylene, methyl isobutyl ketone ("MIBK"), ethyl 3-ethoxypropionate (Eastman™ EEP solvent, Eastman Chemical Company), and/or methyl ethyl ketone ("MEK").

In various embodiments, the present disclosure is also directed to processes employing the engineered resin and moisture-curable coating compositions comprising the engineered resin. Embodiments may include a process for increasing the sag resistance, blistering resistance, and/or weathering resistance of a coating composition. The process may comprise preparing the coating composition by adding the disclosed engineered resin. The resin may comprise an aliphatic isocyanate functional material and a cycloaliphatic isocyanate functional material as described herein. The prepared coating composition comprising the resin may exhibit no substantial sag when applied at a wet film thickness of at least 6 mils. The prepared coating composition comprising the resin may exhibit no substantial blistering when cured to a dry film thickness of at least 6 mils.

Other embodiments of the present disclosure may include a process for coating a substrate. The process may comprise applying a coating composition at a WFT of at least 6 mils. The coating composition may comprise a resin comprising an aliphatic isocyanate functional, material and a cycloaliphatic isocyanate functional material. The applied coating composition may exhibit no substantial sag.

Other embodiments may include a process for coating a substrate. The process may comprise applying a coating composition so that the coating cures to a DFT of at least 6 mils. The coating composition may comprise a resin comprising an aliphatic isocyanate functional material and a cycloaliphatic isocyanate functional material. The cured coating composition may exhibit no substantial blistering.

The illustrative and non-limiting examples that follow are intended to further describe the embodiments presented herein without restricting their scope. Persons having ordinary skill in the art will appreciate that variations of the Examples are possible within the scope of the invention as defined solely by the claims. All parts and percents are by weight unless otherwise indicated.

EXAMPLES

Example 1

An aliphatic moisture-curable coating composition was prepared according to one embodiment. The coating composition contained an engineered resin. The engineered resin was formed from an isocyanate functional material. The isocyanate functional material comprised 28 weight percent of an HDI-based aliphatic isocyanate functional material (the "HDI-based material") and 72 weight percent of an IPDI-based cycloaliphatic isocyanate functional material (the "IPDI-based material")).

The HDI-based material comprised an allophanate reaction product of HDI and a hydroxy-functional polyether prepared using DMC catalysis. The HDI was reacted with the polyether using the processes described in U.S. Pat. No. 7,038,003. The HDI-based material had an average isocyanate functionality of greater than or equal to 4, a glass transition temperature of less than −40° C., and a % NCO of less than 10% by weight. The HDI-based material was essentially free of HDI isocyanurate trimer.

The IPDI-based material comprised an allophanate-modified isocyanurate trimer reaction product of IPDI and a monol. The IPDI was reacted with the monol using the processes described in U.S. Pat. Nos. 5,124,427 and 5,235,018. The IPDI-based material had an average isocyanate functionality of at least 2.3, a glass transition temperature between 25° C. and 65° C., and a % NCO of 10% to 45% by weight.

The moisture-curable coating composition contained the components listed in Table 1 in the indicated approximate weight percentages.

TABLE 1

Example 1 - Coating Composition

| Component | Weight Percentage |
|---|---|
| Joncryl ® 611 | 5.14 |
| methyl n-amyl ketone | 4.03 |
| Aromatic ™ 150 | 5.37 |
| Disperbyk ® 110 | 2.26 |
| Byk ® 431 | 2.00 |
| Byk ® 077 | 0.30 |
| Byk ® 358 | 0.66 |
| Byk ® 306 | 0.03 |
| Tinuvin ® 292 | 0.51 |
| Kronos ® 2310 | 27.74 |
| Imsil ® A-10 | 4.96 |
| Nytal ® 3300 | 4.96 |
| Dabco ® T-12 (10% in A-100) | 0.18 |
| Eastman ™ EEP solvent | 4.6 |
| methyl ethyl ketone | 2.3 |
| p-toluenesulfonyl isocyanate | 0.98 |
| isocyanate functional material | 33.98 |

The aliphatic moisture-curable coating composition was prepared by adding the components in Table 1 beginning with the Joncryl® 611 through the Nytal® 3300 to a grinding vessel. The resulting mixture was ground until a fineness of grind of 6 Hegman was obtained (approximately 30 minutes). The MEK and Eastman™ EEP solvents were added to the resulting dispersion. A portion of the dispersion with added MEK and EEP was used to run a Karl Fischer titration to determine the amount of water in the total dispersion. The p-toluenesulfonyl isocyanate ("PTSI") was added based on the amount of water in the dispersion. The dispersion with added PTSI was allowed to sit for 30 minutes to allow the PTSI to scavenge and remove the water. After the 30 minutes, the isocyanate functional material was added followed by the Dabco® T-12 catalyst. The coating composition was mixed for an additional 10 minutes. The coating composition possessed the properties listed in Table 2.

TABLE 2

Example 1 - Coating Composition Properties

| Property | Value |
|---|---|
| wt % NCO | 3.51 |
| NCO:OH | 0 |
| P/B (pigment/binder) | 1.1 |
| PVC, % | 25.36 |
| VOC, lbs/gal | 2.8 |
| % volume solids | 61.68 |
| % weight solids | 75.57 |
| weight/volume (lbs/gal) | 11.46 |

Example 2

An aliphatic moisture-curable coating composition was prepared according to one embodiment. The coating composition contained an isocyanate functional material comprising 100 percent IPDI-based material and zero percent HDI-based material. The composition contained the components listed in Table 3 in the indicated approximate weight percentages.

TABLE 3

Example 2 - Coating Composition

| Component | Weight Percentage |
|---|---|
| Joncryl ® 611 | 5.15 |
| methyl n-amyl ketone | 3.23 |
| Aromatic ™ 150 | 5.39 |
| Disperbyk ® 110 | 2.26 |
| Byk ® 431 | 2.01 |
| Byk ® 077 | 0.30 |
| Byk ® 358 | 0.66 |
| Byk ® 306 | 0.03 |
| Tinuvin ® 292 | 0.52 |
| Kronos ® 2310 | 27.82 |
| Imsil ® A-10 | 4.97 |
| Nytal ® 3300 | 4.97 |
| Dabco ® T-12 (10% in A-100) | 0.17 |
| Eastman ™ EEP solvent | 3.12 |
| methyl ethyl ketone | 1.96 |
| p-toluenesulfonyl isocyanate | 0.98 |
| isocyanate functional material | 36.46 |

The aliphatic moisture-curable coating composition was prepared according to the procedure described in Example 1. The coating composition possessed the properties listed in Table 4.

TABLE 4

Example 2 - Coating Composition Properties

| Property | Value |
| --- | --- |
| wt % NCO | 4.38 |
| NCO:OH | 0 |
| P/B (pigment/binder) | 1.1 |
| PVC, % | 25.76 |
| VOC, lbs/gal | 2.8 |
| % volume solids | 61.6 |
| % weight solids | 75.78 |
| weight/volume (lbs/gal) | 11.57 |

Example 3

An aliphatic moisture-curable coating composition was prepared according to one embodiment. The coating composition contained an isocyanate functional material comprising 88 percent HDI-based material and 12 percent IPDI-based material. The composition contained the components listed in Table 5 in the indicated approximate weight percentages.

TABLE 5

Example 3 - Coating Composition

| Component | Weight Percentage |
| --- | --- |
| Joncryl ® 611 | 4.16 |
| Neocryl ® B-734 | 0.83 |
| methyl n-amyl ketone | 4.98 |
| Eastman ™ EEP solvent | 5.31 |
| Disperbyk ® 110 | 2.19 |
| Disperbyk ® 192 | 1.10 |
| Byk ® 077 | 0.29 |
| Byk ® 358 | 0.64 |
| Byk ® 306 | 0.03 |
| Byk ® 430 | 1.07 |
| Tinuvin ® 292 | 0.50 |
| Kronos ® 2310 | 26.94 |
| Imsil ® A-10 | 4.81 |
| Nytal ® 3300 | 4.81 |
| Dabco ® T-12 (10% in A-100) | 0.33 |
| p-toluenesulfonyl isocyanate | 1.54 |
| Eastman ™ EEP solvent | 5.76 |
| methyl ethyl ketone | 5.76 |
| isocyanate functional material | 28.95 |

The aliphatic moisture-curable coating composition was prepared according to the procedure described in Example 1. The coating composition possessed the properties listed in Table 6.

TABLE 6

Example 3 - Coating Composition Properties

| Property | Value |
| --- | --- |
| wt % NCO | 1.95 |
| NCO:OH | 0 |
| P/B (pigment/binder) | 1.1 |
| PVC, % | 24.69 |
| VOC, lbs/gal | 2.8 |
| % volume solids | 61.62 |
| % weight solids | 74.91 |
| weight/volume (lbs/gal) | 11.15 |

Example 4

The sag resistance of aliphatic moisture-curable coating compositions prepared according to Examples 1-3 was determined and compared to the sag resistance of two (2) commercially-available polyester modified, aliphatic acrylic polyurethane formulated industrial coating compositions. The sag resistance was evaluated using ASTM D 4400—*Standard Test Method for Sag Resistance of Paints Using a Multinotch Applicator*. The determined values for set-to-touch (STT), hard-dry (HD), and sag resistance (greatest WFT without substantial sag) are presented in Table 7.

TABLE 7

| Property | Example 1- Coating Composition | Example 2- Coating Composition | Example 3- Coating Composition | Commercial Coating Composition No. 1 | Commercial Coating Composition No. 2 |
| --- | --- | --- | --- | --- | --- |
| sag resistance (WFT, mils) | 10 | 6.5 | 12 | 4 | 4 |
| STT (hours) | 3.5 | 3.0 | 1.5 | 3.5 | 0.75 |
| HD (hours) | 24.0 | 24.0 | 11.5 | 7.5 | 7.0 |

Example 5

The blistering resistance of aliphatic moisture-curable coating compositions prepared according to Examples 1-3 was determined and compared to the blistering resistance of two (2) commercially-available polyester modified, aliphatic acrylic polyurethane formulated industrial coating compositions. The blistering resistance was evaluated using a gradient panel as described above. The determined values for set-to-touch (STT), hard-dry (HD), and blistering resistance (FBTB/DFT, mils) are presented in Table 8.

TABLE 8

| Property | Example 1- Coating Composition | Example 2- Coating Composition | Example 3- Coating Composition | Commercial Coating Composition No. 1 | Commercial Coating Composition No. 2 |
| --- | --- | --- | --- | --- | --- |
| FBTB (DFT, mils) | 6.5 | 11.1 | 4.7 | 2.3 | 3.1 |
| STT (hours) | 3.5 | 3.0 | 1.5 | 3.5 | 0.75 |
| HD (hours) | 24.0 | 24.0 | 11.5 | 7.5 | 7.0 |

Example 6

Figure 2:
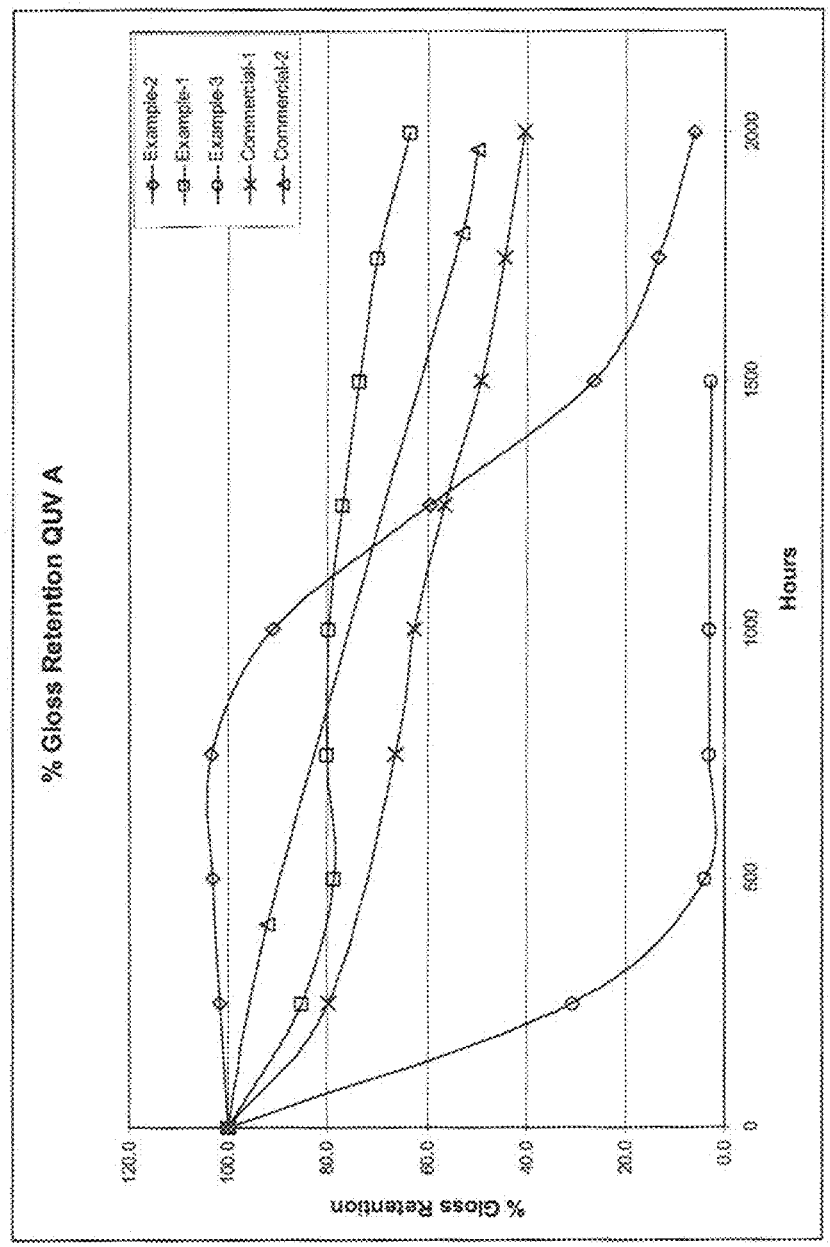
FIG. 2 is graph showing the percentage of initial gloss retained over 2000 hours of exposure to accelerated weathering for three (3) coating compositions prepared according to embodiments disclosed herein and two (2) commercial coating compositions.

The weathering resistance of aliphatic moisture-curable coating compositions prepared according to Examples 1-3 was determined and compared to the weathering resistance of two (2) commercially-available polyester modified, aliphatic acrylic polyurethane formulated industrial coating compositions. The weathering resistance was evaluated using an accelerated weathering process in accordance with ASTM D 4587—*Standard Practice for Fluorescent UV-Condensation Exposures of Paint and Related Coatings*. The accelerated weathering was performed in a QUV fluorescent UV/condensation apparatus in accordance with ASTM G 154—*Standard Practice for Operating Fluorescent Light Apparatus for UV Exposure of Nonmetallic Materials*. The weather resistance was quantified as percent retention of initial gloss measured at a 60 degree angle. The results of the weathering resistance evaluation are presented in FIG. 2. The coating compositions prepared according to Examples 1 and 2, and the commercial coating composition number 1 were subjected to 2000 hours of accelerated weathering. The coating composition prepared according to Example 3 was subjected to 1500 hours of accelerated weathering and the commercial coating composition number 2 was subjected to 1966 hours of accelerated weathering.

Example 7

Figure 3:
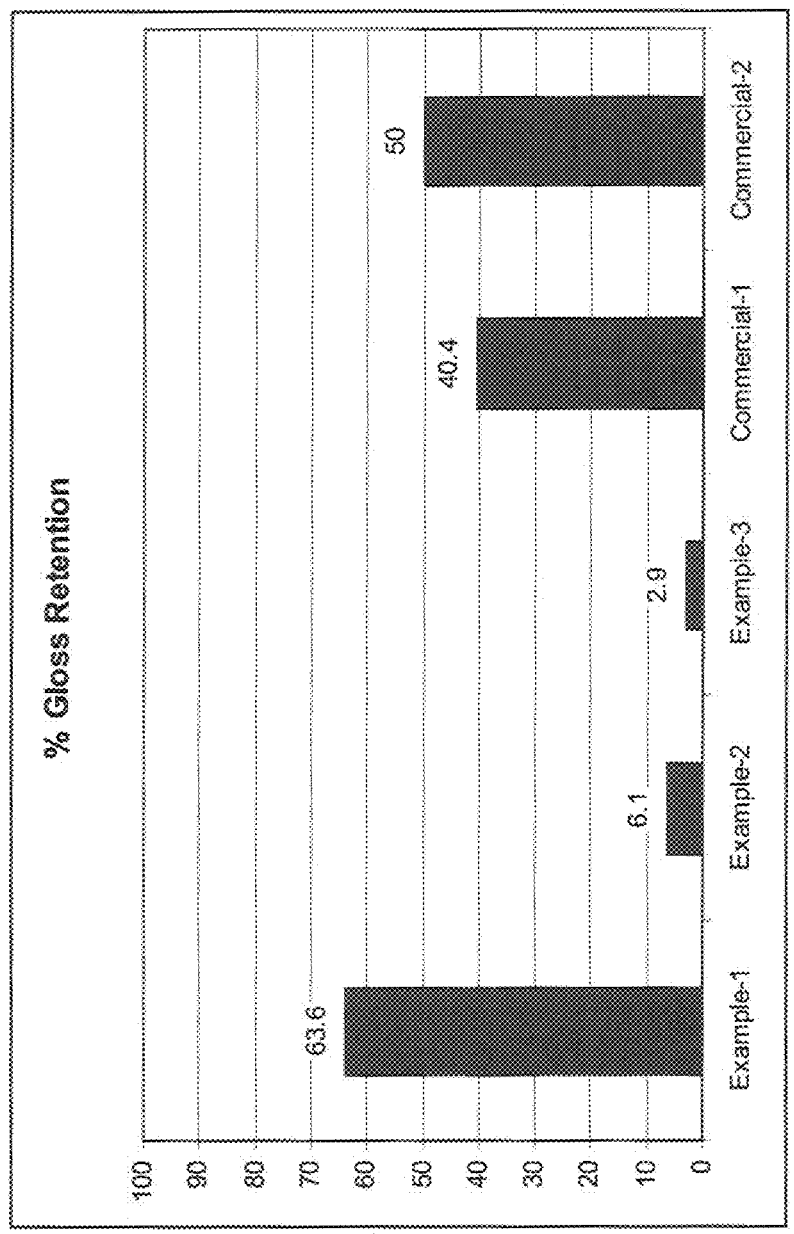
FIG. 3 is a bar graph showing the percentage of initial gloss retained after 2000 hours of exposure to accelerated weathering for three (3) coating compositions prepared according to embodiments disclosed herein and two (2) commercial coating compositions.

The sag resistance, blistering resistance and weathering resistance of the coating compositions prepared according to Examples 1-3 and the two (2) commercially-available coating compositions were compared. FIG. 3 is a bar graph comparing the percentage of initial gloss retained after 2000 hours of exposure to accelerated weathering according to Example 6 (the coating composition prepared according to Example 3 was subjected to 1500 hours of accelerated weathering and the commercial coating composition number 2 was subjected to 1966 hours of accelerated weathering). The coating composition prepared according to Example 1 (28 percent HDI-based material and 72 percent IPDI-based material) exhibited the largest percentage retention of initial gloss after accelerated weathering. This may indicate enhanced weathering resistance compared to the two (2) commercial coating compositions.

Figure 4:
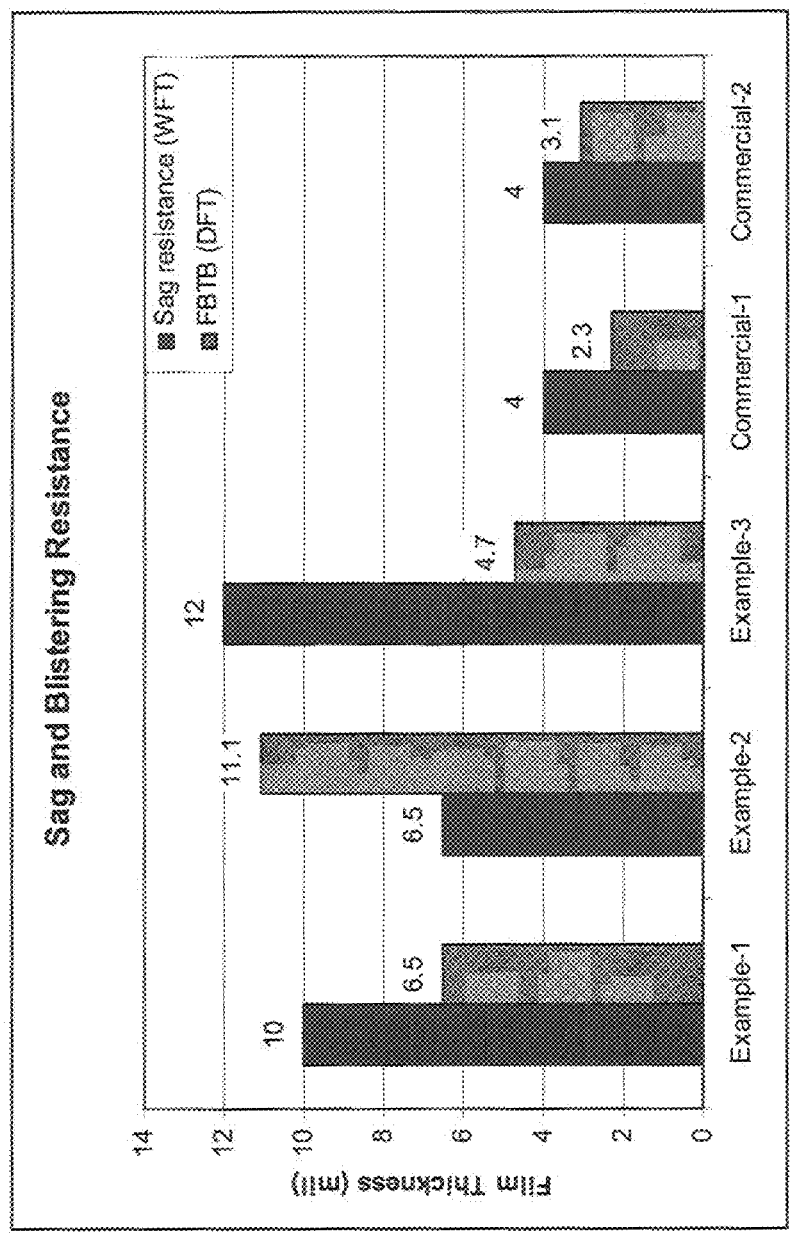
FIG. 4 is a bar graph showing the sag resistance (evaluated as wet film thickness without sag) and blistering resistance (evaluated as dry film thickness before blistering) for three (3) coating compositions prepared according to embodiments disclosed herein and two (2) commercial coating compositions.

FIG. 4 is a bar graph comparing the sag resistance values (greatest WFT without substantial sag) and blistering resistance values (FBTB/DFT) for each coating composition evaluated according to Examples 4 and 5. The three (3) coating compositions prepared according to the disclosed embodiments all surpassed the commercial coating compositions in both sag and blistering resistance. The coating composition prepared according to Example 1 exhibited sag resistance and blistering resistance that were both better than twice the sag resistance and blistering resistance of the commercial coating compositions. Accordingly, a coating composition prepared according to various embodiments may be applied to a substrate at least two (2) times or more as thick as prior coating compositions without substantial sag or blistering and with enhanced weathering resistance.

Example 8

Aliphatic moisture-curable coating compositions were prepared according to ten (10) embodiments. The coating compositions contained an isocyanate functional material comprising the HDI-based aliphatic isocyanate functional material and the IPDI-based cycloaliphatic isocyanate functional material. The ten (10) coating compositions each respectively comprised engineered resin as set forth in Table 9.

TABLE 9

| Coating Composition | Isocyanate Functional Material Formulation | |
|---|---|---|
| | Weight percent IPDI-based cycloaliphatic isocyanate functional material | Weight percent HDI-based aliphatic isocyanate functional material |
| A | 100 | 0 |
| B | 90 | 10 |
| C | 80 | 20 |
| D | 70 | 30 |
| E | 60 | 40 |
| F | 50 | 50 |

TABLE 9-continued

| Coating Composition | Isocyanate Functional Material Formulation | |
|---|---|---|
| | Weight percent IPDI-based cycloaliphatic isocyanate functional material | Weight percent HDI-based aliphatic isocyanate functional material |
| G | 40 | 60 |
| H | 30 | 70 |
| I | 20 | 80 |
| J | 10 | 90 |

The coating compositions contained the components listed in Table 10 in the indicated approximate weight percentage ranges.

TABLE 10

| Component | Approximate weight percentage ranges |
|---|---|
| Joncryl ® 611 | 4.10-4.20 |
| Neocryl ® B-734 | 0.82-0.85 |
| methyl n-amyl ketone | 4.95-5.05 |
| Eastman ™ EEP solvent | 5.30-5.37 |
| Disperbyk ® 110 | 2.18-2.22 |
| Disperbyk ® 192 | 1.10-1.12 |
| Byk ® 077 | 0.28-0.30 |
| Byk ® 358 | 0.63-0.66 |
| Byk ® 306 | 0.02-0.04 |
| Byk ® 430 | 1.06-1.08 |
| Tinuvin ® 292 | 0.49-0.51 |
| Kronos ® 2310 | 26.93-27.20 |
| Imsil ® A-10 | 4.80-4.87 |
| Nytal ® 3300 | 4.80-4.87 |
| Dabco ® T-12 (10% in A-100) | 0.32-0.35 |
| p-toluenesulfonyl isocyanate | 1.53-1.57 |
| Eastman ™ EEP solvent | 2.11-5.77 |
| methyl ethyl ketone | 2.11-5.77 |
| isocyanate functional material | 2.8-35.70 |

The coating compositions were each prepared by adding the components in Table 10 beginning with the Joncryl® 611 through and including the Nytal® 3300 to a grinding vessel. The resulting mixtures were ground until a fineness of grind of 6 Hegman was obtained (approximately 30 minutes). The MEK and Eastman™ EEP solvents were added to the resulting pigment grinds. A portion of the pigment grinds with added MEK and EEP were used to run a Karl Fischer titration to determine the amount of residual water in the total pigment grinds. The PTSI was added based on the amount of water in the pigment grinds. The pigment grinds with added PTSI were allowed to sit for 30 minutes to allow the PTSI to scavenge and react off the residual water. After the 30 minutes, the isocyanate functional material was added followed by the Dabco® T-12 catalyst. The coating compositions were mixed for an additional 10 minutes. The coating compositions possessed the properties listed in Table 11.

TABLE 11

| Property | Coating Composition | | | | | | | | | |
|---|---|---|---|---|---|---|---|---|---|---|
| | A | B | C | D | E | F | G | H | I | J |
| wt % NCO | 4.28 | 4.02 | 3.76 | 3.50 | 3.24 | 2.98 | 2.72 | 2.46 | 2.20 | 1.95 |
| NCO:OH | 0 | 0 | 0 | 0 | 0 | 0 | 0 | 0 | 0 | 0 |
| P/B (pigment/binder) | 1.1 | 1.1 | 1.1 | 1.1 | 1.1 | 1.1 | 1.1 | 1.1 | 1.1 | 1.1 |
| PVC, % | 25.72 | 25.60 | 25.49 | 25.37 | 25.25 | 25.14 | 25.02 | 24.91 | 24.80 | 24.69 |
| VOC, lbs/gal | 2.8 | 2.8 | 2.8 | 2.8 | 2.8 | 2.8 | 2.8 | 2.8 | 2.8 | 2.8 |
| % volume solids | 61.77 | 61.68 | 61.69 | 61.76 | 61.68 | 61.69 | 61.64 | 61.63 | 61.62 | 61.62 |
| % weight solids | 75.64 | 75.50 | 75.44 | 75.43 | 75.30 | 75.24 | 75.13 | 75.05 | 74.98 | 74.91 |
| weight/volume (lbs/gal) | 11.49 | 11.45 | 11.41 | 11.38 | 11.34 | 11.30 | 11.26 | 11.23 | 11.19 | 11.15 |
| Viscosity (KU) | 65.2 | 65.4 | 65.7 | 65.9 | 66.6 | 67.7 | 70.7 | 74.4 | 75.5 | 79.8 |

Example 9

The sag resistance and blistering resistance of aliphatic moisture-curable coating compositions prepared according to Example 8 were determined and compared to the sag resistance and blistering resistance of two (2) commercially-available polyester modified, aliphatic acrylic polyurethane formulated industrial coating compositions. The sag resistance was evaluated using ASTM D 4400—*Standard Test Method for Sag Resistance of Paints Using a Multinotch Applicator*. The blistering resistance was evaluated using a gradient panel as described above. The determined values for sag resistance (WFT, mils) and blistering resistance (FBTB/DFT, mils) are presented in Table 12.

TABLE 12

| Coating Composition | Sag | Blister |
|---|---|---|
| A | 5.5 | 10.5 |
| B | 5.5 | 10.6 |
| C | 5.0 | 11.2 |
| D | 6.0 | 9.7 |
| E | 6.5 | 11.2 |
| F | 6.5 | 5.6 |
| G | 8.0 | 4.7 |
| H | 9.0 | 4.9 |
| I | 10.0 | 4.6 |
| J | 12.0 | 4.7 |
| Commercial-1 | 4.0 | 2.3 |
| Commercial-2 | 4.0 | 3.1 |

Example 10

Figure 5:
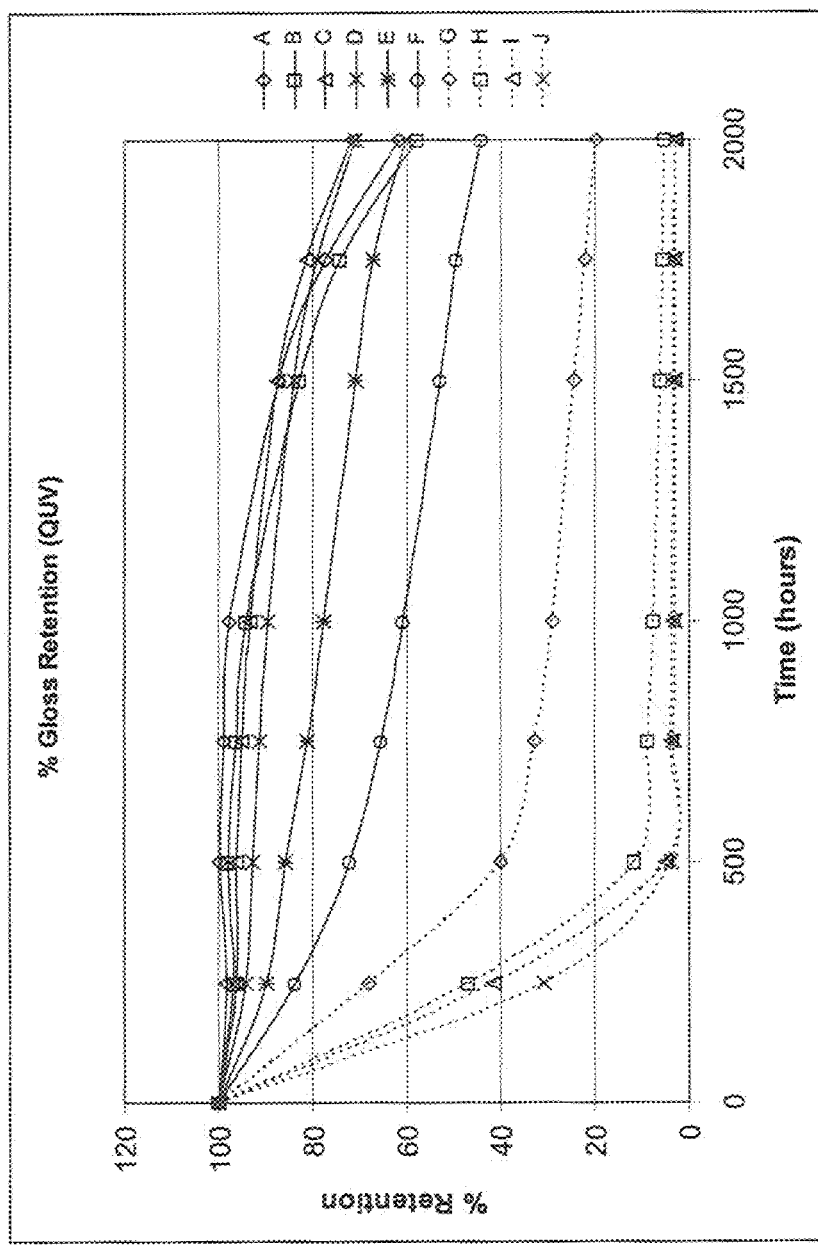
FIG. 5 is a graph showing the percentage of initial gloss retained over 2000 hours of exposure to accelerated weathering for ten (10) coating compositions prepared according to embodiments disclosed herein.

The weathering resistance of aliphatic moisture-curable coating compositions prepared according to Example 8 was evaluated using an accelerated weathering process in accordance with ASTM D 4587—*Standard Practice for Fluorescent UV-Condensation Exposures of Paint and Related Coatings*. The accelerated weathering was performed in a QUV fluorescent UV/condensation apparatus in accordance with ASTM G 154—*Standard Practice for Operating Fluorescent Light Apparatus for UV Exposure of Nonmetallic Materials*. The weather resistance was quantified as percent retention of initial gloss measured at a 60 degree angle. The results of the weathering resistance evaluation are presented in FIG. 5. The coating compositions prepared according to Example 8 were subjected to 2000 hours of accelerated weathering.

Example 11

Figure 6:
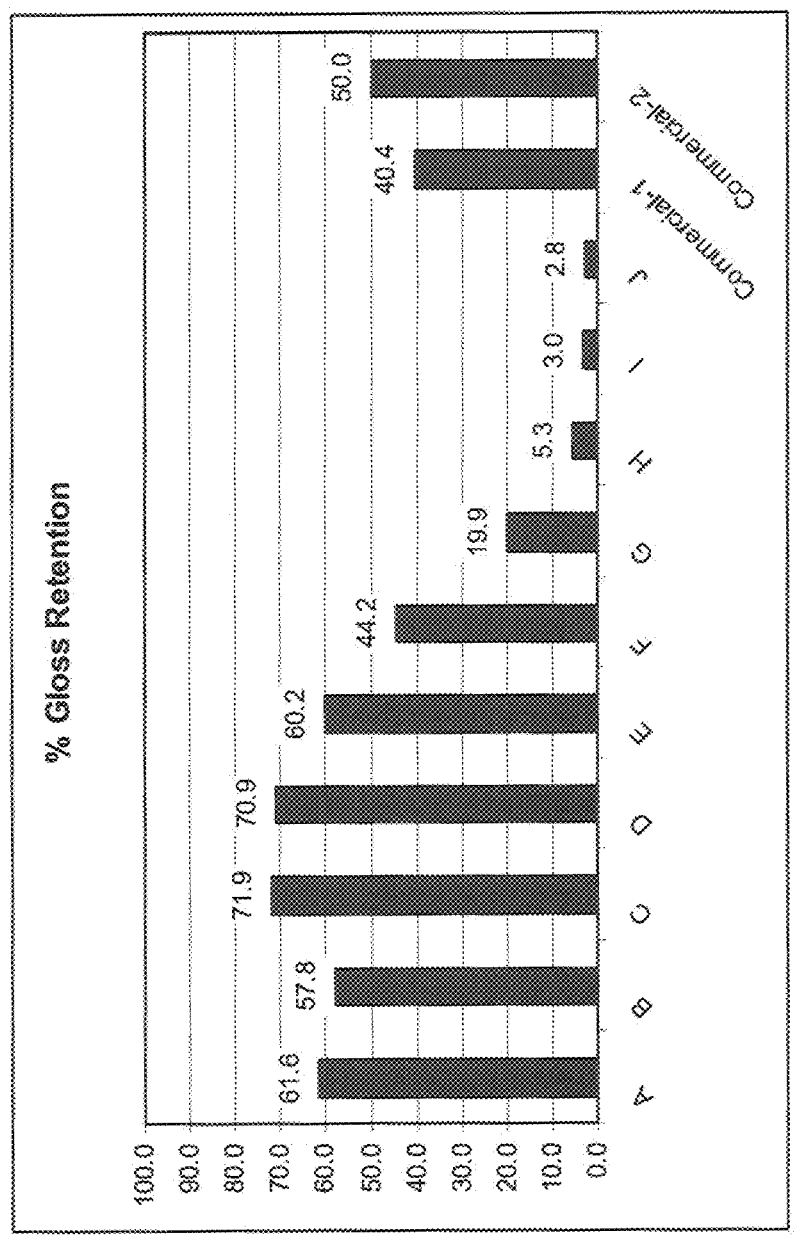
FIG. 6 is a bar graph showing the percentage of initial gloss retained after 2000 hours of exposure to accelerated weathering for ten (10) coating compositions prepared according to embodiments disclosed herein and two (2) commercial coating compositions.

The sag resistance, blistering resistance and weathering resistance of the coating compositions prepared according to Example 8 and two (2) commercially-available coating compositions were compared. FIG. 6 is a bar graph comparing the percentage of initial gloss retained after 2000 hours of exposure to accelerated weathering according to Example 10 (the commercial coating composition number 2 was subjected to 1966 hours of accelerated weathering). The coating compositions prepared according to Example 8 comprised an engineered resin according to a disclosed embodiment, and contained 50 percent, 60 percent, 70 percent, 80 percent, 90 percent, and 100 percent IPDI-based material (respectively, 50 percent, 40 percent, 30 percent, 20 percent, 10 percent, and 0 percent HDI-based material). The coating compositions prepared according to Example 8 exhibited enhanced weathering resistance compared to at least one of the two (2) commercial coating compositions.

Figure 7:
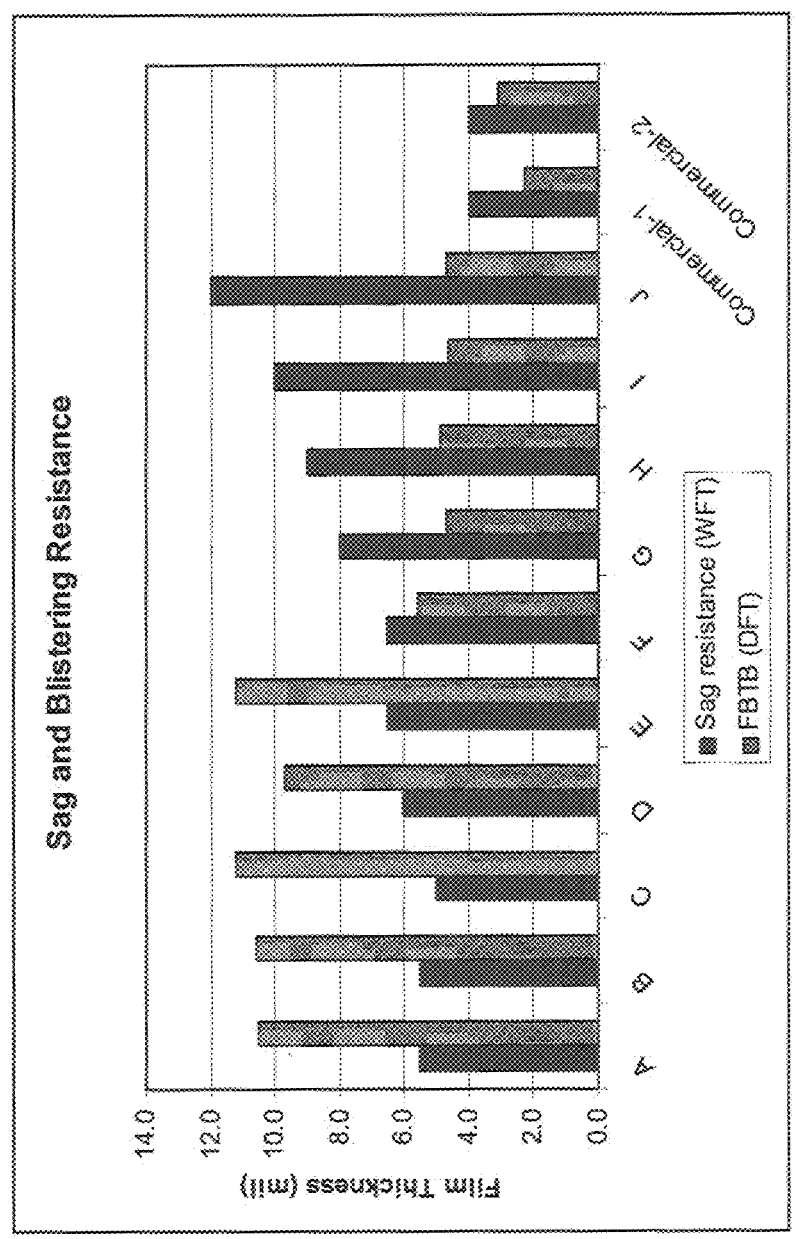
FIG. 7 is a bar graph showing the sag resistance (evaluated as wet film thickness without sag) and blistering resistance (evaluated as dry film thickness before blistering) for 10 (10) coating compositions prepared according to embodiments disclosed herein and two (2) commercial coating compositions.

FIG. 7 is a bar graph comparing the sag resistance values (WFT) and blistering resistance values (FBTB/DFT) for each coating composition evaluated according to Example 9. The ten (10) coating compositions (A-J) prepared according to disclosed embodiments all surpassed the commercial coating compositions in both sag resistance and blistering resistance properties. The coating compositions A-F exhibited blistering resistance that was better than twice the blistering resistance of at least one of the commercial coating compositions. Accordingly, a coating composition prepared according to various embodiments may be applied to a substrate and cured to DFT at least two (2) times or more as thick as prior coating compositions without observable blistering and with enhanced weathering resistance.

Example 12

An aliphatic moisture-curable coating composition was prepared according to one embodiment. The coating composition contained an isocyanate functional material comprising 27.3 percent HDI-based material and 72.7 percent IPDI-based material. The composition contained the components listed in Table 13 in the indicated approximate weight percentages.

TABLE 13

| Component | Weight percentage |
|---|---|
| Joncryl ® 611 | 4.58 |
| Aromatic ™ 150 | 7.91 |
| Disperbyk ® 110 | 2.38 |
| Disperbyk ® 192 | 1.19 |
| Byk ® 431 | 2.94 |
| Byk ® 358 | 0.29 |
| Byk ® 077 | 0.29 |

TABLE 13-continued

| Component | Weight percentage |
|---|---|
| Tinuvin ® 292 | 0.46 |
| Tinuvin ® 1130 | 0.46 |
| Kronos ® 2310 | 27.81 |
| Imsil ® A-10 | 5.96 |
| Nytal ® 3300 | 5.96 |
| methyl n-amyl ketone | 4.76 |
| Eastman ™ EEP Solvent | 3.16 |
| p-Toluenesulfonyl Isocyanate | 1.30 |
| 1,4-Diazabicyclo[2.2.2]-octane (10% in IPA) | 0.08 |
| Dabco ® T-12 (10% in A-100) | 0.08 |
| isocyanate functional material | 30.39 |

The coating compositions were each prepared by adding the components in Table 13 beginning with the Joncryl® 611 through and including the Nytal® 3300 to a grinding vessel. The resulting mixture was ground until a fineness of grind of 6 Hegman was obtained (approximately 30 minutes). The MAK and Eastman™ EEP solvents were added to the resulting pigment grind. A portion of the pigment grind with added MAK and EEP was used to run a Karl Fischer titration to determine the amount of residual water in the total pigment grind. The total pigment grind was heated to 150° F. under a vacuum of −90 kPa for 2 hours. The pigment grind was cooled to room temperature under vacuum. The vacuum was discontinued. An additional quantity of MAK was added equivalent to the mass of solvent vaporized from the pigment grind under vacuum.

A portion of the pigment grind with the additional MAK was used to run a Karl Fischer titration to determine the amount of residual water remaining in the total pigment grind. The PTSI was added based on the amount of residual water remaining in the pigment grind. The pigment grind with added PTSI was allowed to sit for 30 minutes to allow the PTSI to scavenge and react off the residual water. After the 30 minutes, the engineered resin (IPDI allophanate and HDI-polyether) was added followed by the Dabco® T-12 and 1,4-Diazabicyclo[2.2.2]-octane. The coating composition was placed under a −90 kPa vacuum for an additional 30 minutes at room temperature. The coating composition possessed the properties listed in Table 14.

TABLE 14

Example 12 - Coating Composition Properties

| Property | Value |
|---|---|
| wt % NCO | 3.15 |
| NCO:OH | 0 |
| P/B (pigment/binder) | 1.3 |
| PVC, % | 28.97 |
| VOC, lbs/gal | 2.8 |
| % volume solids | 61.73 |
| % weight solids | 75.99 |
| weight/volume (lbs/gal) | 11.67 |

Example 13

The sag resistance, blistering resistance and weathering resistance of an aliphatic moisture-curable coating composition prepared according to Example 12 were determined and compared to the sag resistance and blistering resistance of a commercially-available polyester modified, aliphatic acrylic polyurethane formulated industrial coating compositions.

The sag resistance was evaluated using ASTM D 4400—*Standard Test Method for Sag Resistance of Paints Using a Multinotch Applicator*. The blistering resistance was evaluated using a gradient panel as described above. Four (4) different test conditions were evaluated in the blistering resistance tests: (1) film build to blister (DFT, mils) on a horizontally-disposed substrate cured at 72° F. and 50% relative humidity ("FBTB(H)-72/50"); (2) film build to blister (DFT, mils) on a vertically-disposed substrate cured at 72° F. and 50% relative humidity ("FBTB(V)-72/50"); (3) film build to blister (DFT, mils) on a horizontally-disposed substrate cured at 95° F. and 90% relative humidity ("FBTB(H)-95/90"); and (4) film build to blister (DFT, mils) on a vertically-disposed substrate cured at 95° F. and 90% relative humidity ("FBTB (V)-95/90").

The weathering resistance was evaluated using an accelerated weathering process in accordance with ASTM D 4587—*Standard Practice for Fluorescent UV-Condensation Exposures of Paint and Related Coatings*. The accelerated weathering was performed in a QUV fluorescent UV/condensation apparatus in accordance with ASTM G 154—*Standard Practice for Operating Fluorescent Light Apparatus for UV Exposure of Nonmetallic Materials*. The weathering resistance was quantified as percent retention of initial gloss measured at a 60 degree angle after 2000 hours of accelerated weathering. The results of the evaluations are presented in Table 15.

TABLE 15

| Property | Coating Composition - Example 12 (Batch 1) | Coating Composition - Example 12 (Batch 2) | Commercial Coating Composition |
|---|---|---|---|
| Sag resistance (WFT, mil) | 12 | 12 | 5 |
| FBTB(H) - 72/50 (DFT, mil) | 9.4 | 8.7 | 2.4 |
| FBTB(V) - 72/50 (DFT, mil) | 6.7 | 6.7 | 2.2 |
| FBTB(H) - 95/90 (DFT, mil) | 5.7 | 5.2 | <2.4 |
| FBTB(V) - 95/90 (DFT, mil) | — | 4.4-5.0 | <2.3 |
| STT (hours) | 4 | — | 4 |
| TF (hours) | >24 | — | 7 |
| HD (hours) | >24 | — | 9 |
| % gloss retention after 2000 hours QUV | 58.1 | — | 40.4 |

Example 14

The weathering resistance of an aliphatic moisture-curable coating composition prepared according to Example 12 was evaluated using a standard south Florida weathering process in accordance with ASTM D 1014—*Standard Practice for Conducting Exterior Exposure Tests of Paints and Coatings on Metal Substrates*. The south Florida weathering resistance was also evaluated for a commercial coating composition for comparative purposes. The coating compositions were applied to vertically-disposed steel substrates at 12:00 pm. The air temperature was 93° F. with 60% relative humidity. The temperature of the steel substrates was 102° F. and the temperature of the coating compositions was 95° F. The sag resistance and blistering resistance of the coating compositions were also evaluated under these conditions.

The weather resistance was quantified as percent retention of initial gloss measured at a 60 degree angle according to ASTM D 523—*Standard Test Method for Specular Gloss*. The results of the evaluations are presented in Table 16.

TABLE 16

| Coating Composition | Blast profile (mil) | FBTB (V) (DFT, mil) | Sag resistance (WFT, mil) | STT (hours) | HD (hours) |
|---|---|---|---|---|---|
| Example 12 | 3.57 | 4-5 | 12 | 2 | <20 |
| Commercial | 2.66 | <1.5 mil | 5 | 2 | <20 |

The present disclosure has been written with reference to certain exemplary, illustrative and non-limiting embodiments. However, it will be recognized by persons having ordinary skill in the art that various substitutions, modifications or combinations of any of the disclosed embodiments (or portions thereof) may be made without departing from the scope of the invention as defined solely by the claims. Thus, it is contemplated and understood that the present disclosure embraces additional embodiments not expressly set forth herein. Such embodiments may be obtained, for example, by combining, modifying, or reorganizing any of the disclosed steps, ingredients, constituents, components, elements, features, aspects, and the like, of the embodiments described herein, in any manner that persons having ordinary skill in the art may find useful. Thus, this disclosure is not limited by the description of the exemplary and illustrative embodiments, but rather solely by the claims.

What is claimed is:

1. A moisture-curable resin consisting essentially of:
   an aliphatic isocyanate functional material consisting of an allophanate reaction product of hexamethylene diisocyanate and a hydroxy-functional polyether, with the proviso that the ailihatic funtional material does not include isocyanurate or iminooxadiazine;
   a cycloaliphatic isocyanate functional material consisting of an allophanate-modified isocyanurate trimer reaction product of isophorone diisocyanate and a mono-functional alcohol; and
   optionally additional components selected from the group consisting of additive resins, pigments, tint pastes, pigment wetting agents, pigment dispersants, light stabilizers, UV-absorbers, rheology modifiers, defoamers, dehydrators, solvents, catalysts,
   wherein a coating composition comprising the resin exhibits no substantial sag when applied at a wet film thickness of at least 6mils and wherein the coating composition exhibits no substantial blistering when cured to a dry film thickness of at least 6 mils.

2. The resin of claim 1, wherein the aliphatic isocyanate functional material consists of an allophanate reaction product of hexamethylene diisocyanate and a hydroxy-functional polyether prepared using double metal cyanide catalysis.

3. The resin of claim 1, wherein the aliphatic isocyanate functional material consists of an allophanate reaction product of hexamethylene diisocyanate and a hydroxy-functional polyether, the aliphatic isocyanate functional material having an isocyanate functionality of at least 4, a glass transition temperature less than −40° C., and a % NCO less than 10%.

4. The resin of claim 1, wherein the cycloaliphatic isocyanate functional material consists of an allophanate-modified isocyanurate trimer reaction product of isophorone diisocyanate and a mono-functional alcohol selected from the group consisting of methanol, ethanol, n-propanol, isopropanol, butanol isomers, pentanol isomers, hexanol isomers, heptanol isomers, octanol isomers, nonanol isomers, decanol isomers, 2-ethylhexanol, trimethyl hexanol, cyclohexanol, fatty alcohols having 11 to 20 carbon atoms, vinyl alcohol, allyl alcohol, and combinations of any thereof.

5. The resin of claim 1, wherein the cycloaliphatic isocyanate functional material consists of an allophanate-modified isocyanurate trimer reaction product of isophorone diisocyanate and a mono-functional alcohol, the cycloaliphatic isocyanate functional material having an isocyanate functionality of at least 2.3, and a glass transition temperature between 25° C. and 65° C.

6. The resin of claim 1, wherein the weight ratio of the cycloaliphatic isocyanate functional material to the aliphatic isocyanate functional material ranges from 95:5 to 50:50.

7. A coating composition comprising the moisture-curable resin of claim 1.

8. A process for increasing the sag resistance, blistering resistance, and weathering resistance of a coating composition, the process comprising:
   preparing a coating composition comprising a moisture-curable resin, the resin consisting essentially of:
   an aliphatic isocyanate functional material consisting of an allophanate reaction product of hexamethylene diisocyanate and a hydroxy-functional polyether with the proviso that the aliphatic isocyanate functional material does not include isocyanurate or iminooxadiazine;
   a cycloaliphatic isocyanate functional material consisting of an allophanate-modified isocyanurate trimer reaction product of isophorone diisocyanate and a mono-functional alcohol;
   and
   optionally additional components selected from the group consisting of additive resins, pigments, tint pastes, pigment wetting agents, pigment dispersants, light stabilizers, UV-absorbers, rheology modifiers, defoamers, dehydrators, solvents, and catalysts;
   wherein the coating composition comprising the resin exhibits no substantial sag when applied at a wet film thickness of at least 6 mils, and wherein the coating composition exhibits no substantial blistering when cured to a dry film thickness of at least 6 mils.

9. The process of claim 8, wherein the aliphatic isocyanate functional material consists of an allophanate reaction product of hexamethylene diisocyanate and a hydroxy-functional polyether prepared using double metal cyanide catalysis.

10. The process of claim 8, wherein the aliphatic isocyanate functional material consists of an allophanate reaction product of hexamethylene diisocyanate and a hydroxy-functional polyether, the aliphatic isocyanate functional material having an isocyanate functionality of at least 4, a glass transition temperature less than −40° C., and a % NCO less than 10%.

11. The process of claim 8, wherein the cycloaliphatic isocyanate functional material consists of an allophanate-modified isocyanurate trimer reaction product of isophorone diisocyanate and a mono-functional alcohol selected from the group consisting of methanol, ethanol, n-propanol, isopropanol, butanol isomers, pentanol isomers, hexanol isomers, heptanol isomers, octanol isomers, nonanol isomers, decanol isomers, 2-ethylhexanol, trimethyl hexanol, cyclohexanol, fatty alcohols having 11 to 20 carbon atoms, vinyl alcohol, allyl alcohol, and combinations of any thereof.

12. The process of claim 8, wherein the cycloaliphatic isocyanate functional material consists of an allophanate-modified isocyanurate trimer reaction product of isophorone diisocyanate and a mono-functional alcohol, the cycloaliphatic isocyanate functional material having an isocyanate functionality of at least 2.3, and a glass transition temperature between 25° C. and 65°C.

13. The process of claim 8, wherein the resin has a weight ratio of the cycloaliphatic isocyanate functional material to the aliphatic isocyanate functional material ranging from 95:5 to 50:50.

* * * * *